March 9, 1943.  S. C. EWING ET AL  2,313,528

CONTROL SYSTEM

Filed Dec. 23, 1939

Inventors:
Samuel C. Ewing,
Fred H. Winter,
by Harry E. Dunham
Their Attorney.

Patented Mar. 9, 1943

2,313,528

UNITED STATES PATENT OFFICE 2,313,528

CONTROL SYSTEM

Samuel C. Ewing, Scotia, and Fred H. Winter, Schenectady, N. Y., assignors to General Electric Company, a corporation of New York Application December 23, 1939, Serial No. 310,716

10 Claims. (Cl. 172—289)

This invention relates to control systems, more particularly to control systems for synchronous dynamoelectric machines, and it has for an object the provision of a simple, reliable, and improved system of this character.

Another object of the invention is an improved control system for applying field to a synchronous machine at a predetermined subsynchronous speed of the machine.

In carrying the invention into effect in one form thereof, an electromagnetic switching device is provided for controlling the connection of the field winding of a synchronous machine to a source of supply. This device is provided with closing and lockout coils. Means responsive to an operating condition of the machine are provided for controlling the energization of the coils. This means conditions the closing coil for closing the field applying switching device for intervals of time dependent upon the speed of the machine. Electrical energy storage means are associated with these coils to effect deenergization of the lockout coil at the end of an interval of time corresponding to a predetermined speed of the machine thereby to permit the switching device to close and apply field at this predetermined speed.

In illustrating the invention in one form thereof, it is shown as embodied in a control system for applying the direct current field to a synchronous motor after it has been brought to a suitable subsynchronous speed from which it can be synchronized.

Figure 1:
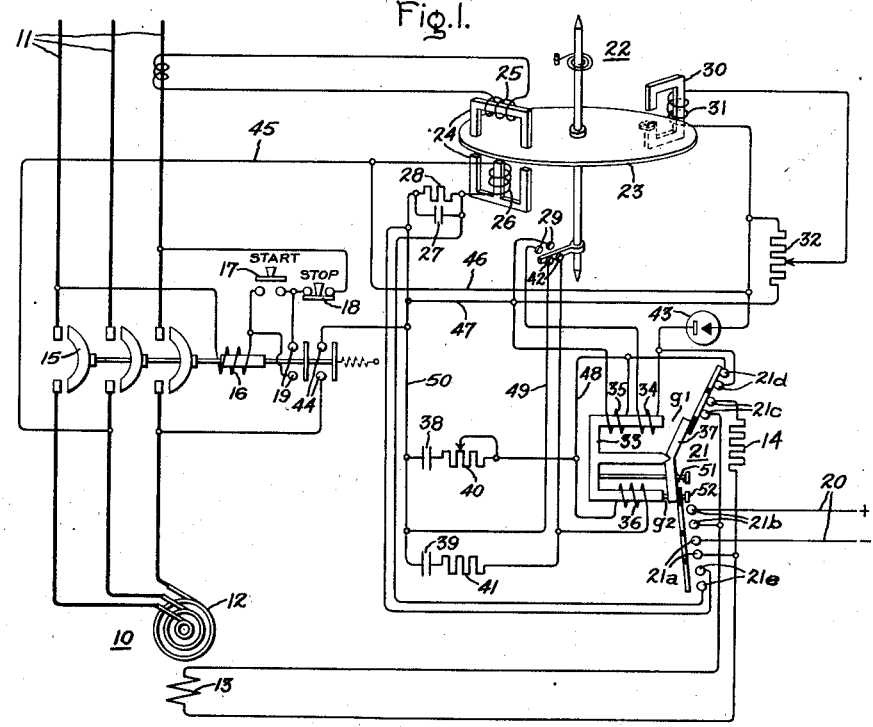
Figure 2:
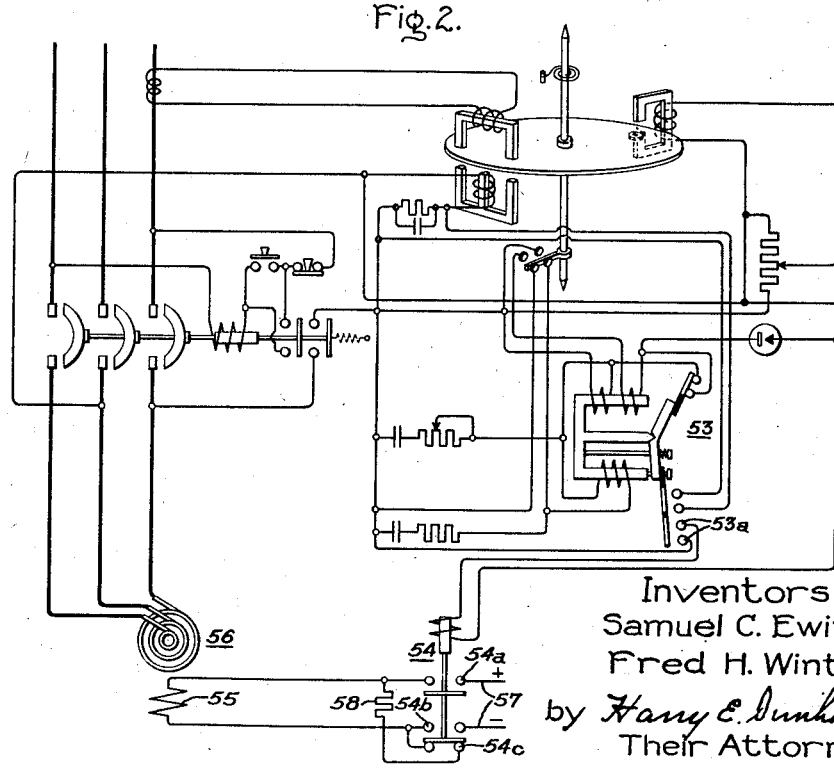

For a better and more complete understanding of the invention, reference should now be had to the following specification and to the accompanying drawing of which Fig. 1 is a simple, diagrammatical illustration of an embodiment of the invention and Fig. 2 is a modification.

Referring now to the drawing, a synchronous motor 10 is arranged to be connected to a suitable source of supply represented by the three supply lines 11. For the purpose of simplifying the disclosure, the invention is shown in connection with a full voltage starting system whereby the motor is started as an induction motor by connecting the motor armature winding 12 directly to the alternating current supply circuit 11 while the field winding 13 of the motor is short circuited through a suitable discharge resistor 14. As shown in the drawing, the armature winding 12 is arranged to be connected directly to the alternating current supply circuit 11 by means of a suitable switch 15 having a closing coil 16 that is arranged to be connected across one phase of the supply circuit 11 when a suitable switch 17 is closed. This control switch 17 is shown as a manually operated device, but it will be understood that it may be automatically controlled in any suitable manner so that it is closed when it is desired to start the motor. The normally closed contacts of a switch 18 are included in the circuit of the closing coil 16. This switch may be controlled in any suitable manner so that its contacts are opened when it is desired to stop the motor. The switch 15, when closed, completes through its auxiliary contacts 19 a locking circuit for the closing coil 16, so that after the switch 15 is closed, the starting control switch 17 may be opened without effecting the opening of the switch 15.

The field winding 13 of the motor is arranged to be connected to a suitable source of excitation 20 by means of the contacts 21a and 21b of an electromagnetic switching device 21, when these contacts are closed. When these contacts are open, as shown in the drawing, contacts 21c connect the discharge resistor 14 across the terminals of field winding 13.

When an unexcited salient pole synchronous motor is operating subsynchronously as an induction motor, the effective impedance of the motor primary winding varies during each half-cycle of slip over a range which is different for each motor speed. This variation in effective impedance is caused by the changes in reluctance of the motor magnetic circuit which result from the movement of the salient poles relatively to the poles of the rotating magnetic field set up by the current in the motor primary winding. The reluctance of the motor magnetic circuit varies with the angular displacement between the axes of the salient field poles and the poles of the rotating magnetic field produced by the current in the armature winding, so that during each half-cycle of slip while the unexcited salient field poles are slipping the distance between the axes of the adjacent poles, produced by the primary current, the reluctance of the motor magnetic circuit alternates between a minimum value and a maximum value.

The variation in impedance of the motor primary circuit causes corresponding variations in the current flowing in the primary winding. Since the effective impedance alternates between a minimum value and a maximum value for each half-cycle of slip, the motor primary current also alternates between a maximum value and a minimum value. These maximum and minimum values of motor primary current are different for each motor speed.

However, when the motor is operating at those subsynchronous speeds, from which it can be synchronized while driving a heavy load, e. g. 96 to 97% of synchronous speed, the minimum value of primary current reached when the motor is operating at 97% speed is not sufficiently less than the minimum value reached at 96% speed to control accurately a relay which operates only in response to current decreasing below a specific current value. Similarly, the maximum and minimum angles of lag of the primary current at these two values of motor speed are not sufficiently different to control accurately a relay which responds only to current having a predetermined phase angle. However, on account of the difference in slip at these two speeds, the length of time the current is below a predetermined value, or lags a predetermined amount, is at least 50% longer when the motor is operating at 3% slip than at 4% slip. Consequently, by combining suitable timing means with a relay which depends for its operation upon the occurrence of a predetermined characteristic of the primary current at the slip at which it is desired to synchronize the motor, the resulting combination is a very sensitive slip responsive arrangement which will effect the application of excitation to the motor field winding at the desired subsynchronous speed.

While it is possible to measure the speed of the motor by means which responds to the motor armature current remaining below a predetermined value for a predetermined time, the present embodiment of the invention employs a single wattmeter type of impedance relay 22 to control the application and removal of field excitation. As shown in the drawing, the impedance relay has a rotatable member 23 and a cooperating wattmetric driving element 24 that includes a current winding 25 energized in response to the current in one of the phase conductors which supplies current to the motor armature 12, and a voltage winding 26 connected in series relation with the parallel connected capacitor 27 and resistor 28 across one of the phases of the supply circuit 11. The driving element 24 exerts on the movable member a torque in a direction to open contacts 29 proportional to $EI \sin (\theta-\phi)$ where E represents the supply circuit voltage applied to the circuit of the voltage winding 26, I represents the current in the supply circuit conductor to which the current winding 25 is connected, $\theta$ represents the power factor angle or the angle by which the current I lags behind its phase voltage, and $\phi$ represents the angle by which the current in the voltage winding 26 lags behind the current I when $\theta$ is zero, that is, when I is at unity power factor. Therefore since $$I=\frac{E}{Z}$$

the wattmetric driving element 24 produces a torque proportional to $$\frac{E^2}{Z} \sin (\theta-\phi)$$

where Z represents the impedance of the circuit through which I flows.

The rotatable member 23 is also provided with another driving element which has a voltage winding 31 connected to one of the phases of the supply circuit 11 which is designed to exert a torque on the rotatable element 23 in a direction to close contacts 29. The voltage winding 31 is connected to the phase of the supply circuit to which the voltage winding 26 of driving device 24 is connected so that the torque exerted by the driving element 30 is proportional to $KE^2$, where K represents a constant. The torque exerted by the element 30 may be adjusted by means of a suitable potentiometer 32 which varies the value of K. Therefore, the resultant torque exerted on the movable element 23 by the two driving elements 24 and 30 is proportional to $$\frac{E^2}{Z} \sin (\theta-\phi) - KE^2 \text{ or } E^2\left(\frac{\sin (\theta-\phi)}{Z}-K\right)$$

The relay is designed so that its inertia is very small and also has substantially no spring restraint. Consequently, the position of its movable member depends mainly on the algebraic sign of the quantity $$\sin \frac{(\theta-\phi)}{Z}-K$$

Therefore, it will be seen that the operation of the relay 22 is not affected by normal variations in the magnitude of the supply voltage and that its operation varies with variations in the impedance of the motor armature circuit.

By varying the relative phases of the currents in the windings 25 and 26 of the relay 22 in any well known manner, as for example, by varying the electrical constants of the circuit of one or both windings, and by adjusting the potentiometer 32, the torque characteristic of the relay can be so adjusted that it will not close its contacts 29 during any portion of a primary current pulsation until the speed of the motor reaches a desired predetermined value. For example, the adjustments may be made so that the relay does not close contacts 29 during any portion of a primary current pulsation until the motor reaches 96% speed. By providing suitable energy storage means such as capacitors in combination with the windings of switching device 21 and utilizing the closing of contacts 29 to initiate the energization of the switching device 21 and the timing operation thereof, the relay will complete its timing operation only when the motor speed has reached such a value that the contacts 29 of relay 22 remain closed during a primary current variation for an interval of time corresponding to the speed at which it is desired to synchronize the motor. It may be assumed that the timing of switching device 21 is adjusted for an interval of time corresponding to 97% of synchronous speed.

In order to effect the removal of the field in response to the motor falling out of synchronism, the connections of the relay 22 are changed in response to application of field so as to recalibrate the relay. This recalibration is brought about by short circuiting the capacitor 27 and parallel connected resistor 28, and it results in immediately opening the contacts 29 if the motor pulls out of step.

The field contactor 21 comprises a magnetic core structure 33, a closing coil divided into two separate coils 34 and 35, a lockout coil 36, and an armature member 37. The closing coils 34, 35 operate to close armature 37 through gap $g_1$ and lockout coil 36 operates to maintain the armature in the position shown with gap $g_2$ closed. The armature mounts the main normally open field applying contacts 21a, 21b and the normally closed contacts 21c for the discharge circuit. Interlocks 21d and 21e are also provided for properly controlling the energizing circuits. Suitable electrical energy storage devices such as capacitors 38 and 39 are connected in the circuits of coils 35 and 36. Variable resistors 40 and 41 are connected in series relationship with capacitors 38 and 39. Resistor 41 serves to limit the current that is short circuited by contacts 42 when closed and to limit the rate of charge of condenser 39 when contacts 42 are open. Resistor 40 limits the rate of discharge of capacitor 38 when contacts 29 are closed and interlock contacts 21d of the field applying contactor are open.

The control source for the field contactor is from any reliable alternating current source through rectifier 43. In practice it is preferred to use the motor terminal voltage as the source of control voltage.

With the foregoing understanding of the elements and their organization, the operation of the system will readily be understood from the following description.

Control switch 17 is closed to complete an energizing circuit for the coil 16 of line switch 15. Line switch 15 closes in response to energization and connects the armature winding of motor 10 directly across the supply circuit 11, so that the motor starts and accelerates as an induction motor. During the starting operation of the motor, a circuit is completed for the motor field winding 13 through the discharge resistor 14 by the contacts 21c of the field applying contactor. In the closed position of line contactor 15, a holding circuit through the "stop" switch 18 is completed by interlock contacts 19. Interlock contacts 44 are also closed and the control power is supplied from the alternating current source through the rectifier 43 to the coils 35 and 36 of the field applying contactor 21. The circuit for coil 35 is traced from the middle motor terminal through conductors 45 and 46, rectifier 43, interlock contacts 21d of field applying contactor, coil 35, conductor 47, and interlock contacts 44 to the right-hand motor armature terminal. The circuit for coil 36 is traced to and through the contacts 21d as before, thence by conductor 48, through coil 36, contacts 42 of relay 22 and conductors 49 and 50, and interlock contacts 44 to the right-hand motor armature terminal.

Since the magnetic circuit of coil 36 has less reluctance through closed gap $g_2$ than the magnetic circuit of coil 35 through open gap $g_1$, and since coil 35 is only a portion of the closing coil, the coil 36 holds the armature 37 in the position shown. Coil 34 is deenergized for this initial starting position by the open contacts 29 of relay 22.

When the motor reaches a speed near synchronism, for example, 96% of synchronous speed, relay 22 will close its contacts 29 and open its contacts 42 for a portion of the armature current variation in each half-slip cycle. Each time the contacts 29 close, a circuit is completed for the coil 34 from the rectifier 43 through coil 34 and contacts 29 to the conductor 47 and right-hand motor armature terminal. When contacts 42 open, the short circuit around capacitor 39 and resistor 41 is removed and the capacitor receives a charge and when the contacts 42 close again, condenser 39 is discharged. While the charging current is flowing through the capacitor, the lockout coil 36 which is in series with the capacitor is maintained energized by the charging current and the field applying contacts are maintained open.

The contacts 42 are not opened for a sufficient length of time to charge capacitor 39 completely until the motor slip has decreased to such a value that the time the motor armature current is below a predetermined value equals the time required to charge the capacitor. Assuming the relay 22 to be adjusted so that its contacts 42 remain open long enough during a half-slip cycle to fully charge capacitor 39 at 97% synchronous speed, the current through the lockout coil 36 becomes zero when the condenser is fully charged and the pull of coil 34 plus the pull of coil 35 will cause armature 37 to close main field applying contacts 21a and 21b. Simultaneously, the armature opens contacts 21c and 21d. Contacts 21a and 21b in closing connect the direct current field winding 13 to the source 20 and thereby apply field to the motor, and contacts 21c in opening interrupt the discharge circuit through resistor 14.

Up to this time in the operating cycle capacitor 38 which is connected in parallel with coil 35 has been fully charged. Consequently, when contacts 21d open and interrupt the connection between coil 35 and rectifier 43, the capacitor 38 discharges through the coil 35 and thereby maintains the coil 35 energized for the interval of time required for the capacitor to discharge. The resistor 40 may be adjusted so that this discharge time is some desired value such as one second. Thus, even though the contacts 29 of relay 22 should open during this time interval on account of some instability in an operating condition of the motor, the field applying contactor 21 will remain closed during this period and keep field on the motor. By maintaining the field on the motor during this time interval, an opportunity is afforded for the motor to slip a pole if necessary to pull into step and for any temporary instability in an operating condition to disappear.

When field contactor 21 closed to apply field to the motor, contacts 21e also closed to short circuit capacitor 27 and resistor 28, thereby to effect a recalibration of relay 22. If the motor should pull out of step, relay 22 will immediately open its contacts 29 and interrupt the energizing circuit for closing coil 34. If the time interval required for capacitor 38 to discharge has elapsed, the field contactor 21 will immediately open its field applying contacts 21a, 21b to remove field from the machine and will also open its contacts 21e to restore the original calibration of relay 22. Simultaneously, it will close contacts 21c to complete a field discharge circuit through resistor 14 and will also close contacts 21d to reestablish the connection from closing coil 35 to the rectifier 43.

When the motor torque, speed and load conditions permit, the field excitation will be reapplied in the manner described in the foregoing.

Adjustment for time of closing by the charge on capacitor 39 can be made adjustable by changing the pressure of spring 51, or by placing nonmagnetic shims in the air gap $g_2$, or by adjusting screw 52 to change the air gap $g_2$, or by changing the capacitance of capacitor 39. A setting corresponding to 3% slip meets the requirements for most applications. Coils 34 and 35 are wound so that their fluxes add if both are energized before contacts 21d open. However, until capacitor 39 is charged, the flux in lockout coil 36 will not permit the contactor to close, and therefore variations in applied voltage for a given setting over the range recognized in motor practice will not change the time action of pickup or speed indication. In other words, field contactor 21 is compensated for variation in voltage and little affected in its time action.

The modification of Fig. 2 is substantially identical with the system of Fig. 1 except that the electromagnetic device 53 is employed as a relay to control the field contactor 54 instead of directly effecting the application of field, as in Fig. 1. The contacts 53a control the energizing circuit for the operating coil of field contactor 54. The normally open contacts 54a and 54b when closed serve to connect the field winding 55 of motor 56 to an excitation source 57. When the contactor is open, the normally closed contacts 54c complete a discharge circuit for the motor field winding 55 through discharge resistor 58. The remainder of the structure and operation is the same as in the system of Fig. 1.

Although in accordance with the provisions of the patent statutes, this invention is described as embodied in concrete form and the principle thereof has been described and the best mode in which it is now contemplated applying that principle, it will be understood that the apparatus and connections shown are merely illustrative and that the invention is not limited thereto, since alterations and modifications will readily suggest themselves to persons skilled in the art without departing from the true spirit of this invention or from the scope of the annexed claims.

What we claim as new and desire to secure by Letters Patent of the United States, is:

1. A system for controlling the application of field to a synchronous machine comprising in combination, a synchronous dynamoelectric machine having a field winding, an electromagnetic switching device for controlling the connection of said field winding to a source of supply, said device having a closing coil and a lockout coil, means responsive to an operating condition of said machine for controlling the supply of direct current to said coils to effect energization and deenergization of said closing coil and lockout coil, electrical energy storage means and electrical connections from said energy storage means to said lockout coil for preventing deenergization of said lockout coil for a predetermined interval of time after energization of said closing coil thereby to prevent pickup of said switching device and application of field to said machine during said time interval.

2. A system for controlling the application of field to a synchronous dynamoelectric machine comprising in combination, a synchronous dynamoelectric machine having a field winding, an electromagnetic switching device provided with closing and lockout coils for connecting said field winding to a source of supply, means responsive to an operating condition of said machine for controlling the supply of direct current to effect energization and deenergization of said coils, capacitor means and electrical connections from said capacitor means to said coils for preventing deenergization of said lockout coil for a predetermined interval of time after energization of said closing coil thereby to prevent pickup of said switching device and application of field to said machine for a predetermined interval of time after energization of said closing coil, and for preventing dropout of said switching device and removal of field from said machine in response to operation of said operating condition responsive means for a predetermined interval of time after application of field to said machine.

3. A system for controlling the application of field to a synchronous dynamoelectric machine comprising in combination, a synchronous dynamoelectric machine having a field winding, an electromagnetic switching device for effecting the connection of said field winding to a source of supply, said switching device having closing and lockout coils, means responsive to a predetermined speed of said machine for controlling the supply of direct current to effect the energization of said coils to pick up said switching device, capacitor means and electrical connections from said capacitor means to said coils for preventing deenergization of said lockout coil and pickup of said switching device for a predetermined interval of time after operation of said speed responsive means and for effecting deenergization of said lockout coil after the expiration of said time interval to provide for pickup of said switching device and application of field to said machine and for preventing dropout of said switching device and removal of field from said machine in response to operation of said speed responsive means for a predetermined interval of time after application of field to said machine.

4. A system for controlling the application of field to a synchronous dynamoelectric machine comprising in combination, a synchronous dynamoelectric machine having a field winding, an electromagnetic switching device provided with closing and lockout coils for effecting the connection of said field winding to a source of supply, a source of direct current, contacts for controlling the connections of said coils to said direct current source to effect energization and deenergization of said coils, means responsive to a predetermined speed of said machine for closing said contacts for intervals of time dependent upon the speed of said machine, capacitor means and electrical connections from said capacitor means to said lockout coil for preventing deenergization of said lockout coil for an interval of time corresponding to a predetermined speed of said machine and for effecting deenergization of said lockout coil at the expiration of said time interval to provide pickup of said switching device and application of field to said machine at said predetermined speed.

5. A system for controlling the application of field to a synchronous machine comprising in combination, a synchronous dynamoelectric machine having a field winding, an electromagnetic switching device provided with two pickup coils and one lockout coil for controlling the connection of said field winding to a source of supply, means for connecting said lockout coil to a source of supply and responsive to a predetermined speed of said machine for connecting a first of said pickup coils to a source of supply and disconnecting said lockout coil from its source of supply for an interval of time dependent on the speed of said machine, a capacitor connected in series relationship with said lockout coil for effecting deenergization of said lockout coil prior to the expiration of said time interval thereby to provide for pickup of said switching device and application of field to said machine at said predetermined speed, means responsive to pickup of said switching device for disconnecting the second of said pickup coils from said source, and a capacitor in parallel with the second of said pickup coils for maintaining it energized for a predetermined interval of time after disconnection from said source thereby to prevent dropout of said switching device and removal of field from said machine during said last mentioned time interval and to provide immediate dropout of said switching device and removal of field from said machine in response to operation of said speed responsive means to disconnect said first pickup coil from said source after expiration of said last mentioned time interval.

6. A system for controlling the application of field to a synchronous machine comprising in combination, a synchronous dynamoelectric machine having a field winding, an electromagnetic switching device provided with two pickup coils and one lockout coil for controlling the connection of said field winding to a source of supply, means for connecting said lockout coil to a source of supply and responsive to a predetermined speed of said machine for connecting a first of said pickup coils to a source of supply and disconnecting said lockout coil from its source for an interval of time dependent on the speed of said machine, a capacitor connected in series relationship with said lockout coil for effecting deenergization of said lockout coil prior to the expiration of said time interval thereby to provide for pickup of said switching device and application of field to said machine at said predetermined speed, means responsive to pickup of said switching device for disconnecting the second of said pickup coils from said source, and a capacitor in parallel with the second of said pickup coils for maintaining it energized for a predetermined interval of time after disconnection from said source thereby to prevent dropout of said switching device and removal of field from said machine during said last mentioned time interval and to provide immediate dropout of said switching device and removal of field from said machine in response to operation of said speed responsive means to disconnect said first pickup coil from said source after expiration of said last mentioned time interval.

7. A system for controlling the application of field to a synchronous dynamoelectric machine comprising in combination, a synchronous dynamoelectric machine having a field winding, an electromagnetic switching device provided with closing and lockout coils for controlling the connection of said field winding to a source of supply, means responsive to an operating condition of said machine for controlling the supply of direct current to said coils to effect energization and deenergization of said coils, capacitor means and connections from said capacitor means to said coils for effecting deenergization of said lockout coil a predetermined interval of time after operation of said responsive means to provide for pickup of said switching device and application of field to said machine, and for maintaining said closing coil energized for a predetermined interval of time after application of field to said machine to prevent dropout of said switching device and removal of field from said machine during said last mentioned time interval, and to provide for immediate removal of field from said machine in response to operation of said operating condition responsive means after the expiration of said last mentioned time interval.

8. A system for controlling the application of field to a synchronous dynamoelectric machine comprising in combination, a synchronous dynamoelectric machine having a field winding, an electromagnetic switching device provided with two closing coils and a lockout coil for controlling the connection of the field winding of said machine to a source of supply, a source of direct current, contacts for controlling the connections of said coils to said source to effect the energization and deenergization of said coils, means responsive to an operating condition of said machine for closing said contacts to energize the first of said closing coils for intervals of time dependent on the speed of said machine, a capacitor connected in series with said lockout coil for effecting deenergization thereof an interval of time after the closing of said contacts corresponding to a predetermined speed of said machine thereby to provide for pickup of said switching device and application of field to said machine at said predetermined speed, and a second capacitor in parallel with the second of said closing coils for maintaining said second closing coil energized for a predetermined interval of time after application of field to said machine thereby to prevent removal of field from said machine in response to opening of said contacts during said last mentioned time interval.

9. A control system comprising in combination, an electromagnetic device provided with a core structure and a relatively movable armature, a pair of pickup coils and a lockout coil mounted on said core structure, means for energizing said pickup coils, electrical energy storage means operatively connected with said lockout coil for maintaining said lockout coil energized for a predetermined interval of time to prevent pickup of said armature and additional electrical energy storage means operatively connected with one of said pickup coils for maintaining said one pickup coil energized for a predetermined interval of time after said armature is picked up thereby to provide time delay dropout of said armature in response to deenergization of the other of said pickup coils during said last mentioned time interval and to provide immediate dropout in response to deenergization of said other coil after the expiration of said last mentioned time interval.

10. In combination, an electromagnetic device having a core structure and a relatively movable armature member, a lockout coil mounted on said core structure, an electrical energy storage device operatively associated with said lockout coil, a pair of coils mounted on said core structure for picking up said armature, means for connecting said pickup coils and said lockout coil to a source of supply with said energy storage device connected in series with said lockout coil so that said lockout coil is energized and said armature prevented from picking up while electrical energy is being stored in said energy storage device and subsequently picked up by said pickup coils, means responsive to pickup of said armature for disconnecting one of said pickup coils from said source, a second energy storage device connected in parallel with said one pickup coil for maintaining said one pickup coil energized and said armature picked up for a predetermined interval of time, thereby to provide time delay dropout in response to deenergization of the other of said pickup coils for an interval of time after pickup, and to provide immediate dropout in response to deenergization of said other pickup coil after the termination of said last mentioned time interval.

SAMUEL C. EWING.
FRED H. WINTER.